(12) United States Patent
Heinrich et al.

(10) Patent No.: US 8,254,632 B2
(45) Date of Patent: Aug. 28, 2012

(54) DETECTION OF MOTOR VEHICLE LIGHTS WITH A CAMERA

(75) Inventors: Stefan Heinrich, Achern (DE); Reinhard Schuler, Rebstein (CH)

(73) Assignee: ADC Automotive Distance Control Systems GmbH, Lindau (DE)

( * ) Notice: Subject to any disclaimer, the term of this patent is extended or adjusted under 35 U.S.C. 154(b) by 596 days.

(21) Appl. No.: 12/312,391

(22) PCT Filed: Oct. 29, 2007

(86) PCT No.: PCT/DE2007/001936
§ 371 (c)(1),
(2), (4) Date: May 6, 2009

(87) PCT Pub. No.: WO2008/064626
PCT Pub. Date: Jun. 5, 2008

(65) Prior Publication Data
US 2010/0061594 A1   Mar. 11, 2010

(30) Foreign Application Priority Data

Nov. 27, 2006 (DE) .......................... 10 2006 055 903

(51) Int. Cl.
*G06K 9/00* (2006.01)
*G08G 1/017* (2006.01)
(52) U.S. Cl. ......... 382/103; 382/104; 382/165; 340/937
(58) Field of Classification Search ............... 250/208.1, 250/214 A; 349/901; 382/100, 103–105
See application file for complete search history.

(56) References Cited

U.S. PATENT DOCUMENTS

| 4,891,559 | A | | 1/1990 | Matsumoto et al. |
| 5,798,786 | A | | 8/1998 | Lareau et al. |
| 5,837,994 | A | | 11/1998 | Stam et al. |
| 5,990,469 | A | * | 11/1999 | Bechtel et al. ............. 250/208.1 |
| 6,044,166 | A | | 3/2000 | Bassman et al. |
| 6,320,176 | B1 | | 11/2001 | Schofield et al. |
| 7,565,006 | B2 | | 7/2009 | Stam et al. |
| 2002/0040962 | A1 | * | 4/2002 | Schofield et al. .......... 250/208.1 |
| 2002/0195949 | A1 | * | 12/2002 | Stam et al. ....................... 315/82 |
| 2004/0143380 | A1 | | 7/2004 | Stam et al. |
| 2004/0164851 | A1 | | 8/2004 | Crawshaw |
| 2004/0183694 | A1 | * | 9/2004 | Bauer ........................... 340/907 |
| 2006/0091813 | A1 | * | 5/2006 | Stam et al. ...................... 315/82 |
| 2006/0177098 | A1 | | 8/2006 | Stam |
| 2008/0165028 | A1 | | 7/2008 | Fechner et al. |

FOREIGN PATENT DOCUMENTS

| DE | 198 20 348 | 11/1999 |
| DE | 102004060461 | 7/2006 |
| DE | 102006055906 | 6/2007 |
| WO | WO 2006/089498 | 8/2006 |

OTHER PUBLICATIONS

International Preliminary Report on Patentability for Application No. PCT/DE2007/001936, dated Jun. 3, 2009, 6 pages, International Bureau of WIPO, Geneva, Switzerland.

* cited by examiner

*Primary Examiner* — Vu Le
*Assistant Examiner* — Amara Abdi
(74) *Attorney, Agent, or Firm* — W. F. Fasse

(57) ABSTRACT

A method for detecting front headlights and tail lights of a motor vehicle uses a color camera sensor that has a plurality of red pixels, i.e. image points which are only sensitive in the red spectral range, and a plurality of pixels of other colors. In a first evaluation stage, only the intensity of the red pixels in the image is analyzed in order to select relevant points of light in the image.

21 Claims, 4 Drawing Sheets

DETECTION OF MOTOR VEHICLE LIGHTS WITH A CAMERA

FIELD OF THE INVENTION

The invention relates to a method for detecting motor vehicle lights with a colour camera sensor. A method of this type is applicable for example for the automatic control of high beam lights of motor vehicle headlights.

BACKGROUND INFORMATION

An automatic light control based on a photosensor is described in the patent application publication DE 19820348. For this purpose, a highly sensitive photosensor is provided in the motor vehicle, which is aligned forwards in the direction of driving. The headlights of an oncoming motor vehicle hit the photosensor when a motor vehicle is approaching, and the high beam or bright headlights are switched off. If a sufficiently low light intensity is again detected by the photosensor when the oncoming motor vehicle has passed by the driver's own motor vehicle and is outside the recording range of the photosensor, then the high beam headlights are switched back on again.

With this very simple method, only the light intensity is measured, but not the type of "light source" which is classified as ambient light, reflector, motor vehicle headlights, street lighting etc. This can cause erroneous functioning of the lighting control.

SUMMARY OF THE INVENTION

The object of the invention is therefore to provide a safe and cost-effective method for detecting motor vehicle lights with a monocamera sensor in a motor vehicle environment.

This object is attained according to the invention by a method and a device as disclosed herein.

A method for detecting motor vehicle lights is described with a colour camera sensor and a data processing unit. In order to save costs, the computing complexity for the detection of motor vehicle lights is reduced. For this purpose, for the selection of motor vehicle lights, only those pixels are evaluated which are sensitive to red light. These pixels are also referred to in this document as red pixels. When a commercially available RGB colour camera chip is used, only a quarter of the data quantity is therefore evaluated. Accordingly, a cost effective data processing unit with a low capacity can be used. The selective examination of the red light recognises in the camera image both the red tail lights of a motor vehicle and the white front headlights, which also comprise a red spectral portion. If the measured intensity now lies above the noise or above a specified threshold value, the points of light in the image are potential motor vehicle lights.

In a preferred embodiment of the invention, points of light with an intensity of the red light above a specified first threshold value T1 are identified as potential motor vehicle headlights. This allocation rule is based on the experience that the headlights of other motor vehicles are usually comparatively bright. In this document, bright areas with any form in the camera image are referred to as points of light. Points of light with an intensity below a second specified threshold value T2 are identified as potential motor vehicle tail lights. This allocation rule is based on the experience that the tail lights of other motor vehicles are shown as being comparatively dark in the image, and do not usually exceed a specified intensity. The threshold value T1 in this method is greater than or equal to the threshold value T2.

In a preferred embodiment of the invention, points of light which have been detected during the red light analysis as potential motor vehicle tail lights are further examined in order to ensure that these really are the tail lights of a motor vehicle. For this purpose, the spectral red portion of a point of light is compared with one or more other spectral portions. With an RGB camera chip, this would be a comparison between the intensity of the red light and the intensity of the blue light and/or the intensity of the green light. Only red points of light are identified as motor vehicle tail lights.

In a further advantageous embodiment of the invention, for points of light which are detected as potential motor vehicle tail lights during the red light analysis, the time-related intensity progression and/or the time-dependent movement of the point of light in the image is analysed. Those points of light which are red, and of which the time-related intensity progression (e.g. intensity gradient, intensity fluctuation etc.) corresponds to that of a self-radiating light source and/or of which the time-dependent movement in the image corresponds to a moved object, are identified as motor vehicle tail lights.

In a preferred embodiment of the invention, points of light which have been detected during the red light analysis as potential motor vehicle headlights are further examined. For this purpose, the time-related intensity progression (e.g. intensity gradient, intensity fluctuation etc.) is examined in order to differentiate motor vehicle headlights from other light sources such as reflectors used to mark the roadway.

BRIEF DESCRIPTION OF THE DRAWINGS

The invention will now be explained in greater detail below with reference to exemplary embodiments and drawings, in which.

DETAILED DESCRIPTION OF EXAMPLE EMBODIMENTS OF THE INVENTION

All the features described here can contribute to the invention individually or in any combination required. A time progression for the method stages is not necessarily specified by the sequence selected here.

Figure 1:
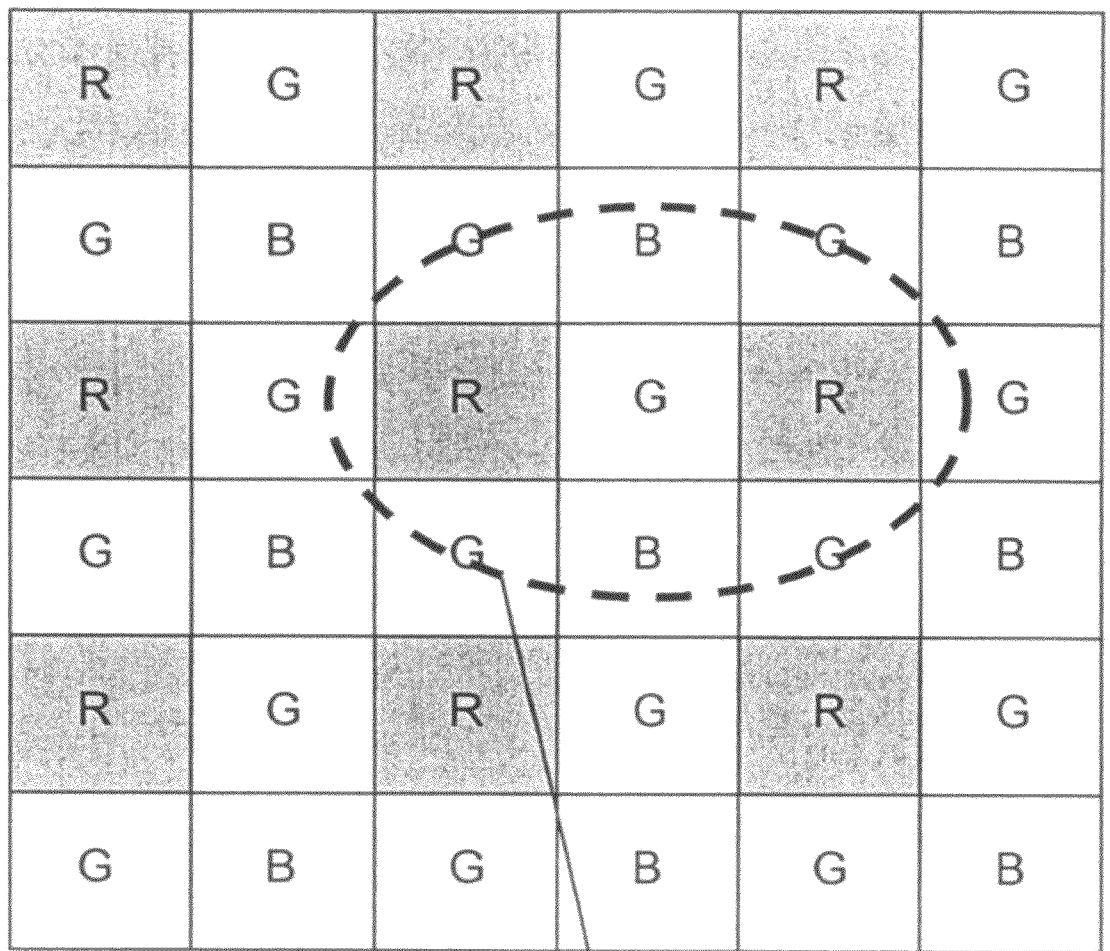
FIG. 1 shows an RGB colour camera chip

In an exemplary embodiment of the method according to the invention, it is determined in a single stage whether the brightness of a red pixel lies above a specified threshold value, which is generally typical for the noise of the camera chip. For improved clarification of the method, the pixel distribution of a typical RGB colour camera chip is shown in FIG. 1. The red pixels are shown against a grey background. It can be seen from the figure that the ratio of red to blue to green pixels is 1:1:2. When only the red pixels are evaluated, only a quarter of the data quantity arising is therefore evaluated. The position of any given point of light 1 is shown with a broken line. In a second method stage, local maxima are determined. For this purpose, the brightness of a red pixel is compared with the brightness of the adjacent red pixel. If the brightness of a red pixel is greater than that of its neighbours, a local maximum is provided. The same naturally also applies to a region with greater brightness which comprises several red pixels, and which is surrounded by darker red pixels. In a third method stage, it is determined whether the local maximum is a bright point of light 1 or a less bright point of light 1. For this purpose, a brightness threshold value T is specified. Points of light 1 with a brightness above the threshold value T are potential motor vehicle headlights. Points of light 1 with a brightness below the threshold value T are potential motor vehicle tail lights. Points of light 1 which are potential motor vehicle headlights are stored and if necessary, the time progression of the intensity and/or the movement of the point of light 1 in the image is examined, in order to differentiate between headlights and e.g. reflectors for marking the roadway. These methods are explained further below with reference to examples. Points of light which are potential tail lights are examined in a further method stage to ascertain whether they are red lights. For this purpose, the pixels of a different colour in the area of the point of light 1 are evaluated at least partially. If an RGB camera chip is used, the green and/or blue pixels are evaluated. The brightness of the blue and/or green pixels is compared with the brightness of the red pixels. If the brightness of the red pixels is significantly greater than the brightness of the pixels of other colours, the point of light 1 is a red light, and therefore a motor vehicle tail light.

In a further exemplary embodiment, the time progression of the intensity and/or the absolute intensity and/or the movement of the point of light in the image is examined in order to differentiate between tail lights and e.g. reflectors for marking the roadway.

In the following, further methods for classifying points of light 1 are given in a camera image. In order to analyse the movement and intensity of points of light 1, both the brightness of the pixels of one colour and the brightness of pixels with different colours can contribute.

Selection of a Suitable Image Section

In an exemplary embodiment of the invention, image sections (windows) are determined, in which a search is made for motor vehicles. As a result of the window processing, the image processing complexity is significantly reduced, since it is no longer necessary to examine the entire image for motor vehicles. In addition, when the traffic lane is known, the window can be positioned onto the anticipated traffic lane in such a manner that erroneous detections of the edge of the road are reduced. The size of the window is selected in such a manner that the motor vehicle objects which are being searched for fit in. An edge range is added which increases in size according to how imprecise the knowledge of the anticipated motor vehicle position is. The vertical position, width and height of the search window is positioned according to a distance hypothesis from the knowledge of the camera image equation (see section: Analysis of the movement of points of light in the image). The window is horizontally positioned on the basis of the knowledge of the progression of the traffic lane in front of the motor vehicle from a previous traffic lane determination by means of image processing. This data is then made available e.g. by a Lane Departure Warning System integrated in the motor vehicle, a passenger assistance system (ACC), a digital card and satellite supported position determination system (e.g. from a navigation system) or from a route assessment which is obtained by means of inertial sensors.

Analysis of the Intensity of Points of Light

I) Analysis of the Time-Related Intensity Fluctuations of Points of Light

Figure 2:
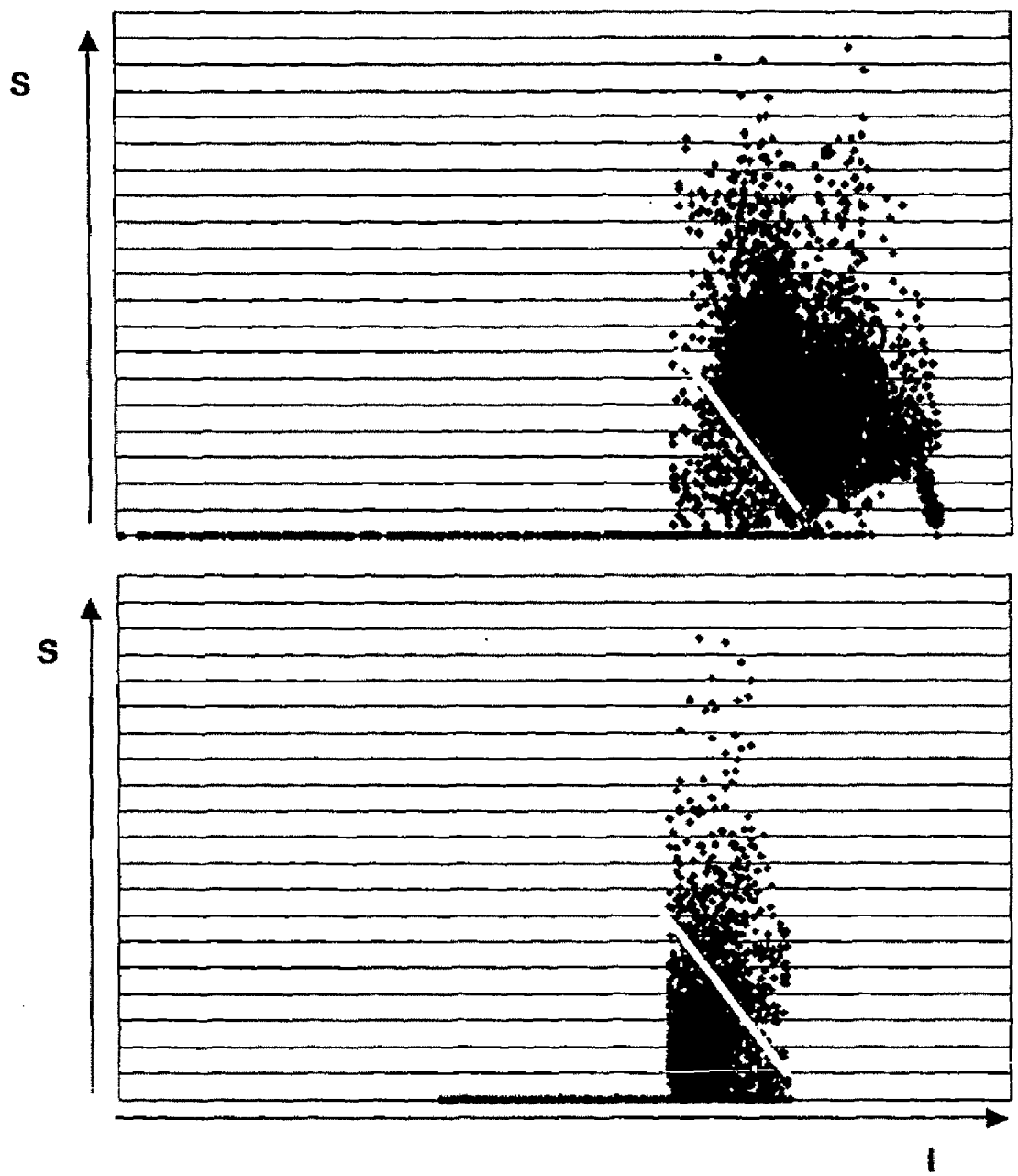
FIG. 2 shows intensity fluctuation S spread over the intensity I for oncoming front headlights (above) and reflectors (below) in a specified intensity range

If a point of light is detected, it is pursued (tracked) in the succession of images. The intensity of a pursued point of light is determined in a large number of images, and the intensity progression is analysed. Here, the fluctuation of the intensity around an average value is of particular interest. Since the intensity of a point of light depends on the distance which usually constantly changes in a moved motor vehicle with the camera, a continuous average value is used to determine the intensity fluctuation. An alternative method of showing the intensity fluctuation is to determine the stroke of successive measurement values. Preferably, the total value of the stroke is applied over the intensity. In FIG. 2 above, the intensity fluctuation is applied for oncoming light sources, and in 2 below, for reflectors in a specified intensity range. It can immediately be seen that the determined intensity fluctuation in the specified intensity range is on average significantly higher for the headlight of an oncoming motor vehicle than the intensity fluctuation for a reflector. In both drawings, FIG. 2 above and 2 below, the same white line is drawn for clarification purposes. In FIG. 2 above (oncoming motor vehicle headlights), there is a clear predominance of intensity fluctuation above the line, while in FIG. 2 below (reflectors marking the roadway), the clear predominance of variance values is arranged below the line. The cause of the different behaviour of the variance is the specific reflection characteristics of reflectors which reflect back the light in the direction from which it has come. Since headlights and camera sensors in a motor vehicle are both subject to the same inherent movement of their own motor vehicle, the incident angle of the reflected light onto the camera chip, and thus the intensity of the point of light, is comparatively constant. If a light source is present, at least their own motor vehicle which carries the camera has its own movement, such as a nodding movement. The incident angle of the light on the camera chip and thus the intensity of the point of light in the image has a comparatively low constancy. This property is used to differentiate between a reflector and a self-radiating light source. Points of light of which the intensity fluctuation values are arranged predominantly below the boundary line are classified as reflectors. Points of light of which the intensity fluctuation values lie predominantly above the line are recognised as self-radiating points of light. The progression of such a boundary line can be firmly specified in a data processing programme. An alternative is to adapt the progression of the boundary line to measured values which have previously been recorded. For this purpose, the variance values of the points of light and their classification (reflector, self-radiating light source) are regarded retrospectively. The classification can be made with the aid of the variance criterion and/or other methods. The boundary line is thus calculated in such a manner that as few variance values as possible from the reflectors lie above the line, and as few variance values as possible from self-radiating light sources lie below the line.

II) Analysis of the Absolute Intensity of Points of Light

Figure 3:
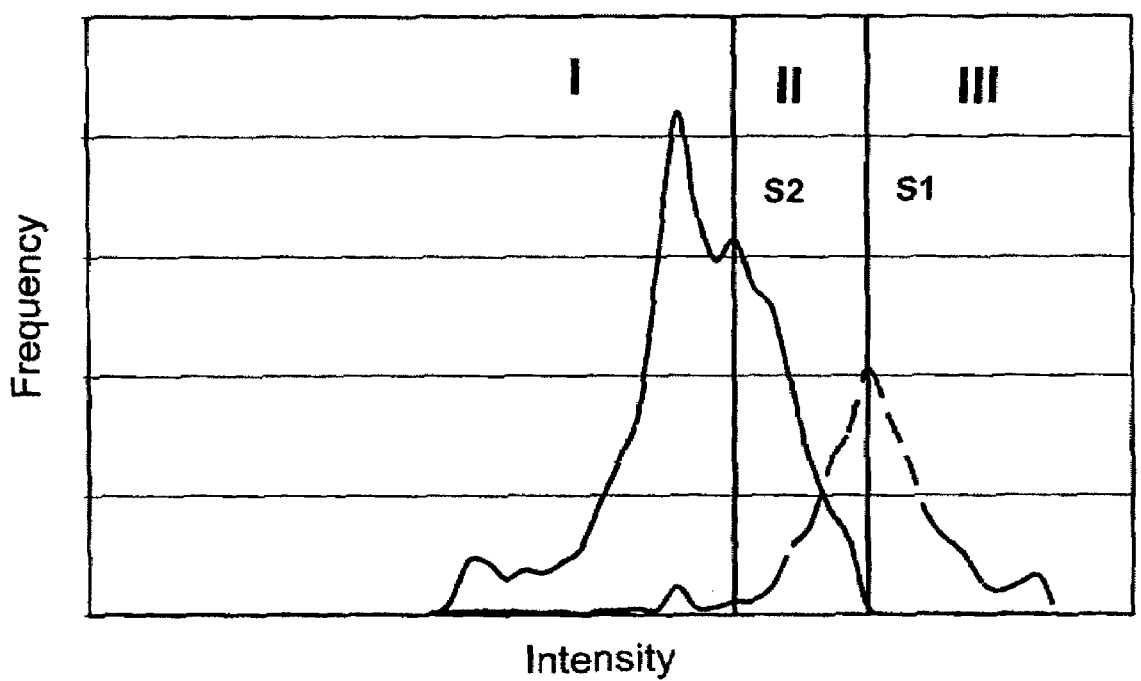
FIG. 3 shows schematic frequency distribution of the intensity of reflectors and motor vehicle lights.
Figure 4:
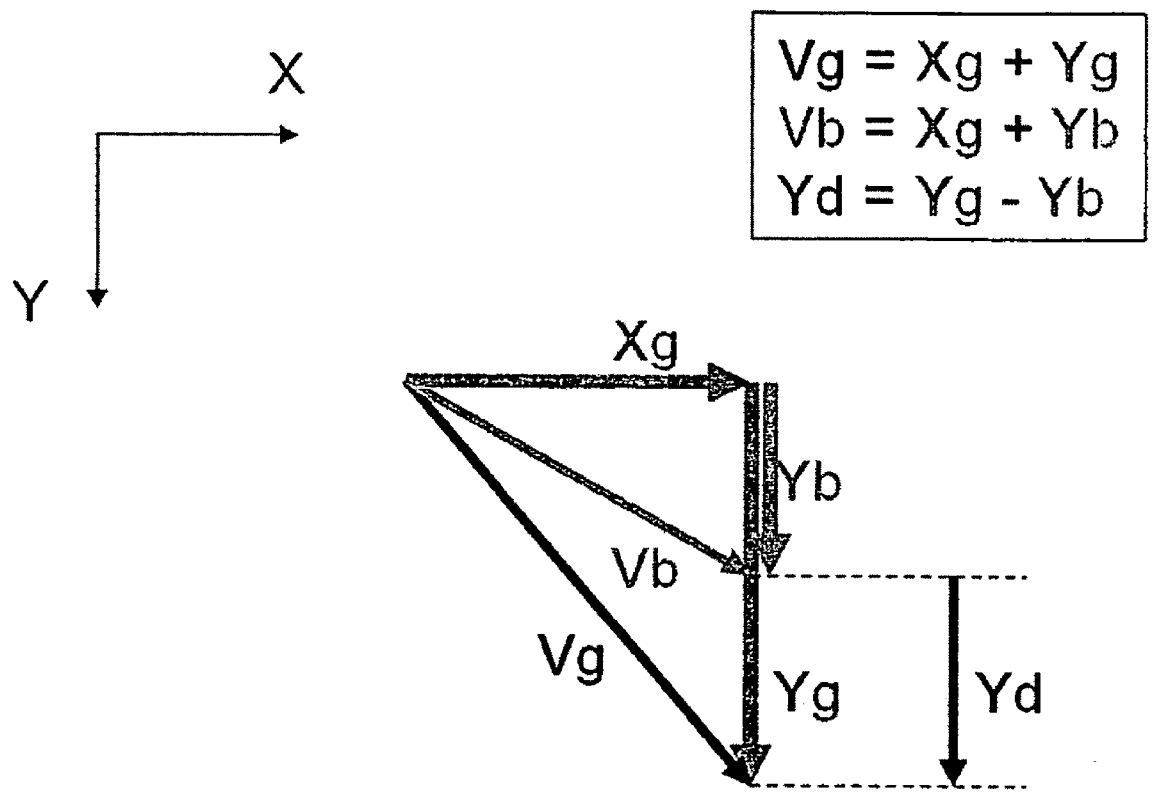
FIG. 4 shows a nodding movement

The intensity of the light of the motor vehicle's own headlights which is reflected back from reflectors is proportionate to $1/x^4$, wherein x indicates the distance between the reflector and the motor vehicle. By contrast, the intensity of self-radiating light sources, usually motor vehicle headlights, is proportionate to $1/x^2$. In other words, at the same distance, motor vehicle headlights of an oncoming motor vehicle are shown as being brighter in the image than reflectors which reflect the headlight light of their own motor vehicle. A typical frequency distribution over the intensity is shown in FIG. 3. The frequency distribution of self-radiating light sources is shown with a broken line, and that of reflectors is shown with an unbroken or solid line. It can clearly be seen that the frequency distributions are offset from each other. In the drawing, three intensity ranges can be identified. In the low intensity range marked I, only reflectors are shown, in the middle intensity range, reflectors and self-radiating light sources are shown, and in the high intensity range marked III, only self-radiating light sources are shown. Accordingly, points of light with an intensity above an upper threshold value S1 are caused by a headlight. Points of light with an intensity below a lower threshold value S2 are caused to a high degree of probability by a reflector. If a point of light has an intensity which lies between the two threshold values S1 and S2, no statement can be made with this method as to whether a reflector or a self-radiating light source is present.

III) Analysis of the Degrees of Intensity

Furthermore, the intensity progression of the at least one point of light is recorded. The intensity of the light from the motor vehicle's own headlights which is reflected back from reflectors is proportionate to $1/x^4$, wherein x indicates the distance between the reflector and the motor vehicle. In other words, based on the time intensity progression, a point of light can be classed as a passive light source (reflector) or as an active, self-radiating light source. This assignment is verified in a preferred embodiment of the invention on the basis of the determined distance of the point of light and the knowledge of the luminance of the motor vehicle's own headlights and the reflection properties of standard reflectors on the edge of the road. In one embodiment of the invention, the distance determination is used in order to determine a probable intensity progression for a passive light source and for an active light source, which is to be used for verification purposes as to whether a reflector or an active light source is present. Equally, in a preferred embodiment of the invention, the intensity of the measured point of light is compared with the anticipated intensity of a front headlight or of a tail light of the standard luminance at the determined distance. The same prediction is made for standard reflectors in the determined distance, assuming the radiance from the motor vehicle's own front headlights. The calculated values are used to verify whether a reflector or an active light source (motor vehicle lights) is present.

In the method presented here, a point of light is identified as a reflector when the time progression of the movement of the point of light essentially conforms to the behaviour of an object which is stationary relative to the roadway, and the time progression of the intensity essentially corresponds to the anticipated progression for a passive light source. Furthermore, a point of light is identified as a motor vehicle light when the time progression of the movement of the point of light essentially conforms to the behaviour of an object which moves relative to the roadway, and the time progression of the intensity essentially corresponds to the anticipated progression for an active light source.

Analysis of the Movement of Points of Light in the Image

I) Image Flow

In order to detect motor vehicle lights, the optical flow of bright, punctiform image objects is determined which are extracted using known image processing methods (correlation, morphological filtering, region segmentation). If the image flow of these image objects is in tune with the motor vehicle's own movement (speed, yaw), it can be assumed that stationary points of light are present. For this purpose, the hypothetical image flow for stationary image points is determined at different distances and is compared with the actual image of the points of light which have been extracted from the current image. If the image flow of said points of light is essentially dominated by the known movement (speed, yaw), these points of light are stationary. If none of the hypotheses for the measured image flow of a point of light applies, the point of light must be a moving light. With the differentiation, the approximate knowledge of the distance between the points of light shown and the motor vehicle is useful, since the image flow depends on the distance of the points of light as well as the own movement of the camera motor vehicle and the possible movement of the points of light. Objects at close range have a stronger image flow than objects located at a distance.

One method of determining the distance of a point or object d with a monocamera is shown. The distance to the monocamera is determined from h the camera installation height, α the camera pitch angle, γ the image line of the point, η the pixel size and f the focal length of the camera $$d = h \cdot \frac{1 - t \cdot \tan\alpha}{t + \tan\alpha} \text{ with } t = y \cdot \frac{\eta}{f}$$

If the forenamed parameters are therefore known following an adjustment of the direction of view of the camera, the distance d can be determined.

II) Fault Caused by the Pitch Movement of the Own Motor Vehicle

A problem which frequently arises when evaluating the direction of movement of a light source is the swaying of the body of the own motor vehicle and thus of the camera. This causes the image flow of objects to be influenced not only by the speed and yaw of the camera motor vehicle, but also by the rotational movement of the body relative to the roadway surface, the pitch movement of the motor vehicle. In contrast to the speed and yaw, the pitch movement cannot simply be measured by sensors. This fault occurs to a greater extent when the roadway surface is uneven, and during longitudinal acceleration (in a positive and negative direction). Regardless of how well the chassis of the camera motor vehicle is able to dampen the forces which are created during this process, faults are always present due to pitch movements.

In the following, an option is presented for determining the pitch movement in order to enable a subsequent compensation. For this purpose, the camera images themselves are analysed. If the chassis dips forward, the camera inclines downwards and all points in the video image are displaced upwards accordingly; conversely, the points move downwards when the motor vehicle body springs back again. Use can now be made of the fact that this movement is the same in the video image for all points, and only occurs in a vertical direction, i.e. the horizontal movement component of the image points remains uninfluenced by the pitch movement of the camera. On the assumption that a stationary object is present with an image point under consideration, the distance between this point and the camera can be calculated from its position in the image, known speed and yaw of the camera motor vehicle, as well as solely from its horizontal displacement. A determination can be made e.g. on the basis of the analysis of the intensity in an image sequence as to whether the object is stationary or moving. If the distance of the point from the horizontal displacement is known, the associated vertical displacement can therefore be determined in turn. Since the horizontal displacement of the point, as explained above, is independent of the pitch movement, this now also applies to the determined corresponding vertical displacement. If the displacement measured in the video image is interfered with by the pitch movement of the camera, this is detected due to a difference between the measured and the calculated vertical displacement. With the determined pitch movement, the corresponding image data can now be corrected. In FIG. 3, the determination of the pitch angle is shown schematically as a vector diagram. Vg represents the overall displacement of an object measured in the image. This vector can be divided into the measured overall displacement in the X direction Xg and in the Y direction Yg. Yb refers to the calculated displacement in the Y direction, which, as was explained above, has been calculated for a stationary object. Yd gives the precise difference between the calculated and the measured displacement in the Y direction, and thus also the influence of the pitch movement.

The invention claimed is:

1. A method for detecting front headlights and/or tail lights of a motor vehicle with a color camera sensor and a data processing unit, wherein the color camera sensor comprises a plurality of pixels which are sensitive only to red light, and a plurality of pixels which are sensitive to light colors other than red, characterized in that in a first evaluation stage for selecting potential motor vehicle headlights or tail lights in the image, only the intensity of those pixels which are sensitive to red light is evaluated, wherein first points of light with an intensity of the red light above a specified first threshold value are identified as potential motor vehicle headlights, and second points of light with an intensity below a specified second threshold value are identified as potential motor vehicle tail lights.

2. The method according to claim 1, characterized in that the second points of light are further evaluated in that the intensity of the pixels which are only sensitive to red light is compared with the intensity of at least one pixel which is sensitive to a color other than red, and the second points of light further determined by the comparison to be red lights are identified as motor vehicle tail lights.

3. The method according to claim 1, characterized in that the second points of light are further evaluated in that the time intensity progression and/or the absolute intensity and/or the time-dependent movement of the second points of light in the image is observed, in order to differentiate between motor vehicle tail lights and other points of light.

4. The method according to claim 1, characterized in that the first points of light are further evaluated in that the time intensity progression and/or the absolute intensity and/or the time-dependent movement of the first points of light in the image is observed, in order to differentiate between motor vehicle headlights and other points of light.

5. A motor vehicle with a camera sensor and a data processing unit including a computer-readable medium encoded with an image data processing program adapted to execute a method according to claim 1.

6. The motor vehicle according to claim 5, wherein the camera sensor comprises an RGB color camera chip having R pixels, G pixels and B pixels arranged in an alternating two-dimensional array pattern.

7. The method according to claim 1, wherein, as a part of the first evaluation stage, only the intensity of those pixels which are sensitive to red light is evaluated for identifying the second points of light as potential motor vehicle tail lights when this intensity for the second points of light is below the second threshold value.

8. The method according to claim 1, wherein the intensity of all colors of light of the second points of light is evaluated for identifying the second points of light as potential motor vehicle tail lights when this intensity for the second points of light is below the second threshold value.

9. The method according to claim 1, wherein the first threshold value is greater than the second threshold value.

10. The method according to claim 1, wherein the first threshold value is the same as the second threshold value.

11. A method of detecting head lights and tail lights of motor vehicles using a color camera sensor that includes first pixels sensitive to red light and second pixels sensitive to at least one color of light other than red, and a data processing unit, wherein said method comprises the steps:

a) detecting a light source in a field of view of said color camera sensor as a point of light on at least one illuminated first pixel among said first pixels and on at least one illuminated second pixel among said second pixels;

b) in said data processing unit, comparing an output of only said at least one illuminated first pixel to a first threshold, and identifying said light source as a potential head light if said output of only said at least one illuminated first pixel is above said first threshold, and c) in said data processing unit, comparing an output of said at least one illuminated first pixel and/or said at least one illuminated second pixel to a second threshold, and identifying said light source as a potential tail light if said output of said at least one illuminated first pixel and/or said at least one illuminated second pixel is below said second threshold.

12. The method according to claim 11, wherein said step c) involves comparing said output of only said at least one illuminated first pixel to said second threshold, and identifying said light source as said potential tail light if said output of only said at least one illuminated first pixel is below said second threshold.

13. The method according to claim 12, wherein said color camera sensor comprises an RGB color camera chip having R pixels as said first pixels, and having G pixels and B pixels as said second pixels, wherein said R pixels, said G pixels and said B pixels are arranged in an alternating two-dimensional array pattern with said R pixels making up ¼ of a total number of all of said pixels;

wherein said steps b) and c) use only said output of only said R pixels of said RGB color camera chip.

14. The method according to claim 12, further comprising the step:

d) for said light source identified as said potential tail light, in said data processing unit, evaluating said output of said at least one illuminated first pixel and said output of said at least one illuminated second pixel to determine whether said light source is a red light source, and identifying said light source as a tail light if said light source was determined to be a red light source.

15. The method according to claim 14, wherein said evaluating comprises comparing said output of said at least one illuminated first pixel to said output of said at least one second pixel, and determining that said light source is a red light source if said output of said at least one illuminated first pixel is greater than said output of said at least one second pixel.

16. The method according to claim 11, for said light source identified as said potential tail light, further comprising an additional step in said data processing unit, of determining whether said potential tail light is a tail light by evaluating at least one of a time intensity progression, an absolute intensity and a time-dependent movement of said point of light in said field of view of said color camera sensor.

17. The method according to claim 11, for said light source identified as said potential head light, further comprising an additional step in said data processing unit, of determining whether said potential head light is a head light by evaluating at least one of a time intensity progression, an absolute intensity and a time-dependent movement of said point of light in said field of view of said color camera sensor.

18. The method according to claim 11, wherein said first threshold is greater than said second threshold.

19. The method according to claim 11, wherein said first threshold is the same as said second threshold.

20. The method according to claim 11, wherein said detecting of said light source as a point of light in said step a) comprises comparing an output of a selected one of said first pixels to an output of an adjacent one of said first pixels adjacent to said selected one, and determining said point of light as a local maximum if said output of said selected one is greater than said output of said adjacent one.

21. A method of detecting head lights and tail lights of motor vehicles using an RGB color light sensor having R pixels sensitive to red light, G pixels sensitive to green light and B pixels sensitive to blue light arranged in an alternating two-dimensional array pattern, and using an image data processing unit, wherein said method comprises:
   a) detecting a point of light on at least one illuminated R pixel and at least one illuminated G pixel or B pixel of said sensor;
   b) in said data processing unit, comparing an output intensity of only said at least one illuminated R pixel to a first threshold and to a second threshold;
   c) in said data processing unit, identifying said point of light as a potential head light if said output intensity of only said at least one illuminated R pixel is greater than said first threshold;
   d) in said data processing unit, identifying said point of light as a potential tail light if said output intensity of only said at least one illuminated R pixel is less than said second threshold;
   e) in said data processing unit, if said point of light was identified as a potential head light, then further evaluating an output of at least one of said illuminated pixels to determine whether said point of light is a head light, and
   f) in said data processing unit, if said point of light was identified as a potential tail light, then further evaluating an output of at least one of said illuminated pixels to determine whether said point of light is a tail light.

* * * * *